United States Patent [19]
Germanetti

[11] Patent Number: 5,305,236
[45] Date of Patent: Apr. 19, 1994

[54] METHOD AND SELF-CONTAINED SYSTEM FOR HARMONIZING EQUIPMENTS ON BOARD A VEHICLE, USING MEANS OF MEASURING THE EARTH'S GRAVITATIONAL FIELD

[75] Inventor: Serge A. Germanetti, Marseille, France

[73] Assignee: Societe Anonyme dite: Aerospatiale Societe Nationale Industrielle, Paris, France

[21] Appl. No.: 841,385

[22] Filed: Feb. 25, 1992

[30] Foreign Application Priority Data

Mar. 7, 1991 [FR] France .................. 91 02721

[51] Int. Cl.⁵ .............................. G01C 21/00
[52] U.S. Cl. .................... 364/559; 364/454; 33/356
[58] Field of Search ........... 364/453, 454, 559, 571.01, 364/571.02, 434; 33/356; 324/244, 245, 246, 247

[56] References Cited

U.S. PATENT DOCUMENTS

| | | | |
|---|---|---|---|
| 3,803,387 | 4/1974 | Lackowski | 235/61.5 |
| 4,134,681 | 1/1979 | Elmer | 356/152 |
| 4,845,856 | 7/1989 | Rochette | 33/228 |
| 4,930,085 | 5/1990 | Kleinschmidt | 364/449 |
| 5,001,647 | 3/1991 | Rapiejko | 364/453 |
| 5,050,087 | 9/1991 | Walrath et al. | 364/453 |
| 5,150,856 | 9/1992 | Gaide | 244/3.2 |
| 5,172,323 | 12/1992 | Schmidt | 364/453 |

FOREIGN PATENT DOCUMENTS

| | | |
|---|---|---|
| 0278825 | 8/1988 | European Pat. Off. . |
| 0383043 | 8/1990 | European Pat. Off. . |
| 1236806 | 3/1967 | Fed. Rep. of Germany . |
| 1128516 | 9/1968 | United Kingdom . |

Primary Examiner—Thomas G. Black
Assistant Examiner—Michael Zanelli
Attorney, Agent, or Firm—Marshall, O'Toole, Gerstein, Murray & Borun

[57] ABSTRACT

A method for harmonizing an equipment relative to a vehicle, such as a helicopter, based upon sensing of the gravitational field in a number of reference systems. The equipment is installed fixedly on board the vehicle which, relative to a first absolute reference system (RM), has an orientation defined by a second reference system (R2) tied to the vehicle. The equipment is subjected to the earth's gravitational field represented by a gravity vector $\vec{g}$ oriented along its gradient. The orientation of the equipment is defined, relative to the first absolute reference system (RM), by a third reference system (R3). The equipment includes a device for measuring the components of the gravity vector $\vec{g}$, and the vehicle carries a computer, a memory associated with the computer; and a link connecting the equipment to the computer and to the memory. The gravitational field is measured when the vehicle is in a number of different orientations, and the equipment is harmonized to the vehicle based thereon.

10 Claims, 3 Drawing Sheets

METHOD AND SELF-CONTAINED SYSTEM FOR HARMONIZING EQUIPMENTS ON BOARD A VEHICLE, USING MEANS OF MEASURING THE EARTH'S GRAVITATIONAL FIELD

BACKGROUND OF THE INVENTION

The present invention relates to a method, and a system employing same, enabling one or more equipments set up on board a vehicle to be harmonized in a self-contained manner. In particular, and in a non-limiting manner, the invention applies to aircraft.

It is known that certain equipments loaded on board a vehicle must have a fixed orientation relative to the latter; this is the case in particular for inertial navigation instruments, detection instruments and armaments systems. The collection of these equipments must operate using common reference axes, which requires an initial setting of each of their reference axes. To do this, a reference trihedral is defined for the vehicle, which serves as basis of reference for the orientation of reference trihedrals relating to the various equipments. Such a setting operation is called harmonization or alignment.

Various procedures are known for carrying out this operation.

A sophisticated procedure, following French Patent 2 610 101, consists in mounting the equipment to be harmonized on a rack comprising a fixed part, integral with the vehicle, and an adjustable part integral with the equipment, the position of this equipment being referenced by optical sighting and modified by reference to another optical measurement appertaining to an already harmonized reference system. This procedure customarily serves for the harmonization of the inertial modules mounted on board aircraft.

Such a procedure is fairly tricky to implement since it requires sighting means external to the vehicle, and, furthermore, it necessitates being able optically to access the equipments to be harmonized, this being a significant constraint in the choice of their location.

This procedure determines the harmonization error angles for each equipment and requires them to be corrected later by a mechanical rotation. By virtue of this, it is lengthy and tricky to implement.

Another procedure consists in using fitment planes produced with the desired accuracy and harmonized. This requires accurately positioning an appliance relative to the vehicle and later making it carry out an accurate machining of the fitment plane, which is thus harmonized. This fitment plane later receives two accurately machined centering pins on which the equipment will be mounted.

This procedure, which uses successive transfers of accuracy of mechanical positioning, is awkward to implement. In particular, it requires as many fitment planes as there are equipments to be installed, and the latter must also have available accurately machined fixing means, this raising the cost.

Another procedure consists in arranging the equipment in a fixed rack and in determining the harmonization error by comparing between an appliance, serving as reference to define the axes of the vehicle, and another appliance temporarily substituted for the equipment to be harmonized. The harmonization error, which is stored in the memory of a computer of the vehicle, serves subsequently for the latter to correct, through calculation, the values output by the equipment. The latter must clearly have an accurate fixing device which is a copy of that of the appliance which has been substituted.

This procedure thus avoids mechanical adjustments, but requires, however, a reproducibility of the fixing means, as well as measurement by optical sighting.

For its part, the patent US-A-4 134 681 describes a harmonization procedure using two laser beams, the orientation of each of which is detected by two equipments which define the components of these beams in their characteristic trihedral. A computer receives these data and has available sufficient equations to determine the three angles of error between these two equipments. Since one of these equipments is already harmonized, the calculated error in angle is thus the harmonization error of the other equipment.

Such a procedure thus avoids a mechanical adjustment since the computer will be capable of correcting, through calculation, the data provided by the equipment which is not mechanically harmonized. However, it requires optical measurements and therefore imposes constraints as regards the positioning of the equipments.

SUMMARY OF THE INVENTION

The aim of the present invention is to remedy these various disadvantages and permit the harmonization of equipments on board a vehicle supplied with a computer receiving the data output by the various equipments having to be harmonized, in particular an aircraft.

To this end, the method according to the invention, for harmonizing an equipment relative to a vehicle, said equipment being installed fixedly on board said vehicle which, relative to a first absolute reference system, has an orientation defined by a second reference system tied to said vehicle, said equipment being subjected to the earth's gravitational field represented by a gravity vector $\bar{g}$ oriented along its gradient, and the orientation of said equipment being defined, relative to said first absolute reference system, by a third reference system, this equipment comprising a device for measuring the components of said gravity vector fixed to said equipment; and said vehicle carrying:
- a computer;
- a memory associated with said computer; and
- a first link connecting the equipment to said computer and to said memory,
  is noteworthy in that it comprises the following steps:
- there is arranged, fixedly on board the vehicle, an appliance, also referred to as a gravity-sensing apparatus, harmonized relative to the latter, comparable to said equipment, connected to said computer and to said memory by a second link;
- the vehicle is placed in a first fixed position relative to the ground, corresponding to a first positioning of said second reference system relative to said first absolute reference system;
- with the gravity-sensing apparatus, first values are measured, representative of the components of a vector $\bar{g}_{11}$ representing the earth's gravitational field $\bar{g}$ sensed by the gravity-sensing apparatus in the second reference system, and said first values are transformed into first data indicative of said first values;
- said first data are transmitted to the memory, via said second link connecting the gravity-sensing apparatus to said memory, and stored therein;
- with said equipment, second values are measured, representative of the components of a vector $\bar{g}_{21}$ representing the earth's gravitational field $\bar{g}$ sensed by the equipment in the third reference system, and said second values are transformed into second data indicative of said second values;
- said second data are transmitted to the memory, via said first link, and stored therein;
- the vehicle is placed in a second fixed position relative to the ground, corresponding to a second positioning of said second reference system relative to said first absolute reference system;
- with the gravity-sensing apparatus, third values are measured, representative of the components of a vector $\bar{g}12$ representing the earth's gravitational field $\bar{g}$ sensed by the gravity-sensing apparatus in the second reference system, and said third values are transformed into third data indicative of said third values;
- said third data are transmitted to the memory, via said second link connecting the appliance to said memory, and stored therein;
- with the equipment, fourth values are measured, representative of the components of a vector $\bar{g}22$ representing the earth's gravitational field $\bar{g}$ sensed by the equipment in the third reference system, and said fourth values are transformed into fourth data indicative of said fourth values;
- said fourth values are transmitted to the memory, via said first link, and stored therein;
- in the computer, from said first data, second data, third data and fourth data, is calculated a first rotation operator $R1(\alpha, \beta, \Gamma)$ correcting the angular errors of harmonization of the measurements made in said third reference system of said equipment relative to those made in said second reference system of said vehicle, according to the relationships:

$$\begin{vmatrix} \bar{g}11 \\ \bar{g}12 \end{vmatrix} = \begin{vmatrix} R1(\alpha, \beta, \Gamma) & 0 \\ 0 & R1(\alpha, \beta, \Gamma) \end{vmatrix} \times \begin{vmatrix} \bar{g}21 \\ \bar{g}22 \end{vmatrix}$$

- the rotation operator $R1(\alpha, \beta, \Gamma)$ is stored and incorporated in the computer which applies it to angles $\Phi2, \theta2, \Omega2$ determined subsequently from subsequent measurements, respectively representative of the angles of roll, of pitch attitude and of heading which are measured by said equipment, giving subsequent measured gravitational data indicative of subsequent values measured by said equipment according to its third reference system.

Thus, by means of two sets of measurements made by two similar instruments, the harmonization error of one of them can be determined without the need for optical sighting.

It should be noted that, in this method, said first data and third data, on the one hand, and said second data and fourth data, on the other hand, may advantageously be respectively representative of the angles $\Phi1, \theta1$ and $\Omega1$, representing the angle of roll, the angle of pitch attitude and the angle of heading of said vehicle, on the one hand, and of the angles $\Phi2, \theta2$ and $\Omega2$ representing the angle of roll, the angle of pitch attitude and the angle of heading of said equipment.

In this way, the value of these angles is directly accessible in respect of the harmonization correction calculations, this enabling them to be performed more rapidly.

Moreover, the method according to the invention can be applied to a plurality of M (M: positive integer) equipments to be harmonized relative to said vehicle, each of these equipments having first characteristic rotation operators $R1(\alpha i, \beta i, \Gamma i)$ (with i=1 to M), this offering the advantage of simultaneously determining the plurality of first rotation operators $R1(\alpha i, \beta i, \Gamma i)$, from measurements made by the various equipments and by an appliance.

The time required for harmonizing this plurality of equipments is thus independent of the number of said equipments, this offering a definite improvement relative to the procedures mentioned earlier.

Furthermore, certain equipments may comprise communications interfaces, this affording greater flexibility in respect of the harmonization.

Moreover, said method, applied to said plurality of equipments to be harmonized, permits the use of a single memory.

By virtue of this, no supplementary memory need be added when a supplementary equipment is to be harmonized.

Similarly, said method, applied to said plurality of equipments to be harmonized, permits the use of a single computer.

This single computer can thus process all the data from the installed instruments, without the need to adjoin other computers. It also has available all the measurement results, this avoiding data exchanges which would slow down the system.

Said method according to the invention also offers the advantage of being able to be supplemented with supplementary measurements which increase the accuracy of the correction of the harmonization error thereof, by means of the following steps:
- with the equipment are measured data relating to supplementary orientations of the vehicle;
- said data relating to the supplementary orientations of the vehicle are transmitted to the computer via the first link;
- in the computer a second rotation operator $R2(\alpha, \beta, \Gamma)$ is calculated, used, instead of the first rotation operator $R1(\alpha, \beta, \Gamma)$, to correct the errors of harmonization of the equipment(s).

The initial corrections are thus improved continually, through the effect of incorporating a large number of measurements, this enabling a resolution to be obtained greater than that of a measuring instrument.

Moreover, the method according to the invention makes it possible to choose as gravity-sensing apparatus the highest performing of the instruments of the type of the equipment to be harmonized.

Thus is available a reference of the best accuracy obtainable.

This method also allows for at least the appliance or at least one equipment to provide, moreover, data relating to the speed and/or the acceleration of said vehicle.

Thus is available supplementary information enabling the accuracy of the measurements to be further improved.

Furthermore, a system, employing said method for harmonizing an equipment relative to a vehicle, said equipment being installed fixedly on board said vehicle which, relative to a first absolute reference system, has an orientation defined by a second reference system tied to said vehicle, said equipment being subjected to the earth's gravitational field represented by a gravity vector $\bar{g}$ oriented along its gradient, and the orientation of said equipment being defined, relative to said first absolute reference system, by a third reference system, is notable in that this equipment comprises a device for measuring the components of said gravity vector $\bar{g}$ fixed to said equipment; and in that said vehicle carries:

- a computer;
- a memory associated with said computer; and
- a first link connecting the equipment to said computer and to said memory.

Thus, said system permits, in self-contained manner, harmonization of equipments, without needing external means of calculation or of optical sighting.

Furthermore, said system offers the advantage of enabling at least the gravity-sensing apparatus or at least one equipment to provide, moreover, data relating to the speed and/or the acceleration of said vehicle.

The accuracy of the calculated results is thus improved.

The figures of the attached drawing will make it clearly understood how the invention can be embodied. In these figures, identical references designate identical or similar elements.

DETAILED DESCRIPTION OF A PREFERRED EMBODIMENT

Figure 1:
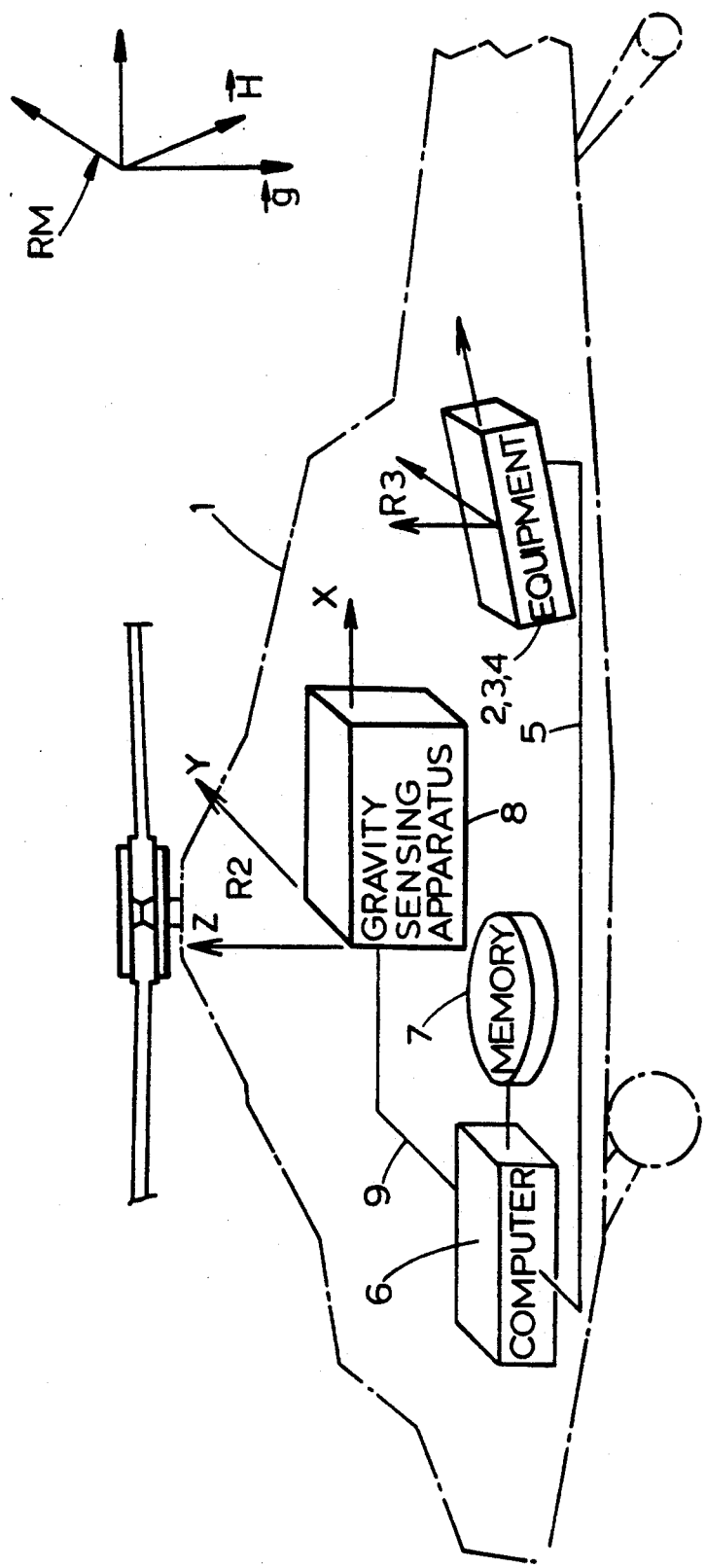
FIG. 1 represents diagrammatically a vehicle in which is set up an equipment to be harmonized.

A vehicle 1 is represented diagrammatically in FIG. 1, in the form of a helicopter, in which is set up an equipment 2 having to be harmonized in relation to this helicopter. This equipment 2 comprises a device for measuring the components of the gradient of gravitational field, which defines the vertical, in the form of an accelerometer unit 3 or a gyrometer unit 4, or both. A first link 5 connects the equipment 2 to a computer 6 and to an associated memory 7. Furthermore, an already harmonized appliance 8, comprising an equipment comparable to the equipment 2, is also set up in the vehicle 1. A second link 9 enables the appliance 8 to be connected to the memory 7 through the computer 6.

The equipment 2 and the appliance 8 can measure, in an orientation reference system which is characteristic to each and tied fixedly to it, the components of an oriented physical quantity of locally constant amplitude, represented by a vector, such as the vector $\vec{g}$ oriented along the gradient of the earth's gravitational field, and which defines the vertical.

The orientation of the reference systems is defined in the following way. A first absolute reference system RM is defined, serving as absolute orientation reference for other reference systems. A second reference system R2 is tied fixedly to the vehicle 1 and defines the orientation of the latter relative to the first absolute reference system RM. A third reference system R3 is tied fixedly to the equipment 2 and defines the orientation of the latter relative to the first absolute reference system RM. Preferably, these reference systems consist of tri-orthogonal trihedrals.

The two reference systems R2 and R3 exhibit a harmonization error which can be represented by a rotation operator $R(\alpha, \beta, \Gamma)$ defined from the Euler angles making it possible to go from one reference system to the other, as explained below. This rotation operator $R(\alpha, \beta, \Gamma)$ constitutes an operator representing the harmonization error of the equipment 2, and which, by applying it to the components of the vector which are measured by this equipment 2, makes it possible to calculate corresponding values of components of this vector which are not marred by the harmonization error.

Figure 2:
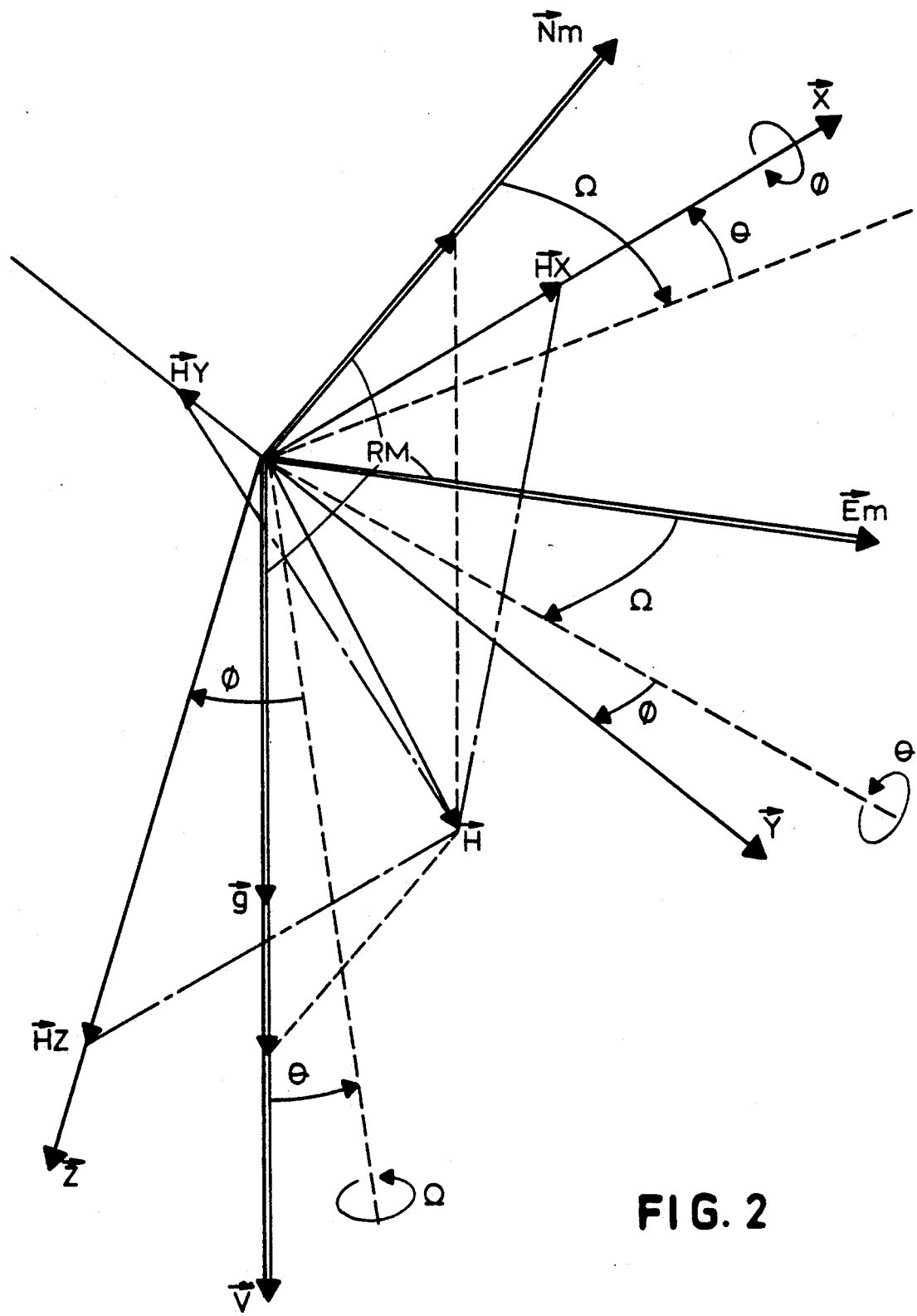
FIG. 2 represents orientation reference systems enabling the various instruments to be referenced.

As FIG. 2 shows, by using the direction of the local magnetic field $\vec{H}$ and of the gradient of the earth's gravity $\vec{g}$, it is possible to define the absolute reference system RM consisting, for example, of axes defining a local tri-orthogonal trihedral formed by an axis $\vec{V}$ parallel to the gradient of the earth's gravitational field and oriented towards the center of the Earth, and giving the local vertical, by a horizontal axis $\vec{N}m$, giving the magnetic north, and by a third axis $\vec{E}m$ giving the magnetic east. The gradient of the gravitational field, represented by the vector $\vec{g}$, is colinear with $\vec{V}$, whereas the local magnetic field, represented by a vector $\vec{H}$, is contained in the plane defined by the axes $\vec{V}$ and $\vec{N}m$, and therefore has a component along both these axes $\vec{V}$ and $\vec{N}m$ respectively.

If a second trihedral of axes $\vec{X}\ \vec{Y}\ \vec{Z}$ is defined, representing the second reference system of the vehicle 1, and in which the measurements of the three components $\vec{H}X, \vec{H}Y, \vec{H}Z$ of this same vector $\vec{H}$ are made, going from one to the other of these reference trihedrals RM and XYZ requires three successive rotations defined by Euler angles defined as:

$\Omega$: angle of magnetic heading
$\theta$: angle of pitch attitude
$\Phi$: angle of roll.

These three rotations can be written according to the conventional matrix for the Euler angles:

$$R(\Phi, \theta, \Omega) = \begin{vmatrix} \cos\Omega\ \cos\theta & \cos\Omega\ \sin\theta\ \sin\Phi - \sin\Omega\ \cos\Phi & \sin\Omega\ \sin\Phi + \cos\Omega\ \sin\theta\ \cos\Phi \\ \sin\Omega\ \cos\theta & \cos\Omega\ \cos\Phi + \sin\Omega\ \sin\theta\ \sin\Phi & \sin\Omega\ \sin\theta\ \cos\Phi - \cos\Omega\ \sin\Phi \\ -\sin\theta & \cos\theta\ \sin\Phi & \cos\theta\ \cos\Phi \end{vmatrix}$$

The first absolute reference system RM can then serve as local reference for each of the abovementioned instruments, that is to say the equipment 2 and the appliance 8, which are able to measure the components of the gradient vector of the earth's gravitational field $\vec{g}$ in the axes of their own reference system, the existence of deviations between the measurements of the three components of the same vector $\vec{g}$ by two similar instruments is evidence of an error of orientation between their reference systems. Thus, the components measured along the axes of the reference system of the relevant instrument can be expressed through simple trigonometric relationships, from the amplitude of this vector and from the angle which it makes with each of the axes, thereby enabling this angle to be determined. If the components of this same vector, when they are measured in the trihedral of the other instrument, are not identical, it suffices to rotate the reference trihedral of the latter until equality is obtained in the homologous components in the two trihedrals, this being done in the form of a mathematical correction simulating the effect of a physical rotation of the reference trihedrals. However, sufficient equations must be available to be able to determine the value of the angles reflecting the orientation error of the third reference system R3 of the equipment 2 to be harmonized relative to the second reference system R2 of the vehicle 1, this being explained below.

In order to establish a communication between the appliance 8 and the equipment 2 to be harmonized, the latter includes an input enabling it to receive from outside the absolute references with which it is to be harmonized.

Harmonization is performed in a fixed position, the vehicle 1 having landed in accordance with angles $\Phi1$, $\theta1$ which are known in the first absolute reference system RM, and are measured by the appliance 8 which includes an inertial module at least as accurate as that to be harmonized. As indicated earlier, the appliance 8 is previously harmonized by means, for example, of one of the procedures indicated initially.

The harmonization operation is performed by making measurements of the components of the gradient vector of the earth's gravitational field $\bar{g}$ according to two different orientations of the vehicle 1. This requires storing said measurements for two orientations of this vehicle 1. These measurements of components of the vector $\bar{g}$ can be transformed into values of angles $\Phi$, $\theta$, $\Omega$ which are indicative of the orientation of the reference system of the instrument which made these measurements.

For this purpose, the vehicle 1 will be placed in a first position, defined by angles of roll $\Phi11$ and of pitch attitude $\theta11$, and which can be determined from measurements made by the appliance 8 in the second reference system R2, whereas, for its part, the equipment 2 makes it possible, through its measurements, to define angles of roll $\Phi21$ and of pitch attitude $\theta21$ in its third reference system R3.

This leads on to starting a first series of steps, as indicated below:
- there is arranged, fixedly on board the vehicle 1, the appliance 8 harmonized relative to the latter, and comparable to said equipment 2;
- the vehicle 1 is placed in said first fixed position relative to the ground, corresponding to a first positioning R21 of said second reference system R2 relative to said first absolute reference system RM; then the continuation of said first series of steps is performed by carrying out the following steps:
- with the appliance 8 are measured first values representative of the components of a vector $\bar{g}11$ representing the earth's gravitational field $\bar{g}$ sensed by the appliance 8 in the second reference system R2, and said first values are transformed into first data indicative of said first values;
- said first data are transmitted to the memory 7, via said second link 9 connecting the appliance 8 to said memory 7, and stored therein.

Simultaneously with the execution of said continuation of the first series of steps, data enabling the angles $\Phi2$ and $\theta2$ of the module 2 to be determined will be measured and stored.

This leads on to performing the following steps, constituting the end of said first series of steps:
- with said equipment 2 are measured second values representative of the components of a vector $\bar{g}21$ representing the earth's gravitational field $\bar{g}$ sensed by the equipment 2 in the third reference system R3, and said second values are transformed into second data indicative of said second values;
- said second data are transmitted to the memory 7, via said first link 5, and memorized therein.

The two vectors thus measured are related through the relationship:

$$\bar{g}11 = R1(\alpha, \beta, \Gamma) \times \bar{g}21$$

or, expressed through their components:

$$\begin{vmatrix} -\sin\theta 11 \\ \sin\Phi 11 \cos\theta 11 \\ \cos\Phi 11 \cos\theta 11 \end{vmatrix} = R1(\alpha, \beta, \Gamma) \times \begin{vmatrix} -\sin\theta 21 \\ \sin\Phi 21 \cos\theta 21 \\ \cos\Phi 21 \cos\theta 21 \end{vmatrix}$$

which uses a first rotation operator $R1(\alpha, \beta, \Gamma)$, with value close to that of the theoretical operator $R(\alpha, \beta, \Gamma)$, enabling the measurements made by the equipment 2 to be corrected by means of the computer 6.

However, this relationship is equivalent to two equations with three unknowns and must therefore be supplemented with at least one supplementary equation, this being done by performing a second series of steps similar to said first series of steps, whilst modifying the orientation of the second reference system R2 of the vehicle 1 relative to the first absolute reference system RM, this being done by displacing said vehicle in such a way that its second reference system R2 has an orientation markedly different from the previous one R21, relative to said first absolute reference system RM.

The components of the vector $\bar{g}$ which are sensed by the appliance 8 and the equipment in this second position will then be measured, these measurements of components of the vector $\bar{g}$ being transformable into values of angles of roll, of angles of pitch attitude and of heading, respectively $\Phi12$, $\theta12$, $\Omega12$, in respect of the appliance 8, and $\Phi22$, $\theta22$, $\Omega22$ in respect of the equipment 2, and which are indicative of the orientation of the reference system of the instruments which made these measurements.

A second relationship is thus available, similar to the previous one, in which the last index of the components of the measured vector has become 2 instead of 1, this resulting in the following group of relationships:

$$\begin{vmatrix} \bar{g}11 \\ \bar{g}12 \end{vmatrix} = \begin{vmatrix} R1(\alpha, \beta, \Gamma) & 0 \\ 0 & R1(\alpha, \beta, \Gamma) \end{vmatrix} \times \begin{vmatrix} \bar{g}21 \\ \bar{g}22 \end{vmatrix}$$

This is a system of three independent equations with three unknowns $\alpha$, $\beta$, $\Gamma$, obtained by virtue of the assumption of non-colinearity of the vectors $\bar{g}21$ and $\bar{g}22$, and which is solved in conventional manner.

The first rotation operator $R1(\alpha, \beta, \Gamma)$ is then stored and incorporated in the computer 6 which applies it to the angles $\Phi2$, $\theta2$, $\Omega2$ which are determined subsequently from subsequent measurements, giving subsequent data indicative of subsequent values measured by the equipment 2.

Having specified the rotation $R1(\alpha, \beta, \Gamma)$, the latter will be incorporated at the level of the whole of the navigation installation, so as to correct the measurements provided by the equipment 2 by the angles $\alpha$, $\beta$, $\Gamma$. Consequently, after obtaining the first and second rotation operator $R1(\alpha, \beta, \Gamma)$ or $R2(\alpha, \beta, \Gamma)$, the result of teh method is to make virtually equal, or equal, the measurements of the angles $\Phi$, $\theta$, $\Omega$ in the second reference system R2 of the vehicle 1 and in the third reference system R3 of the equipment 2.

Figure 3:
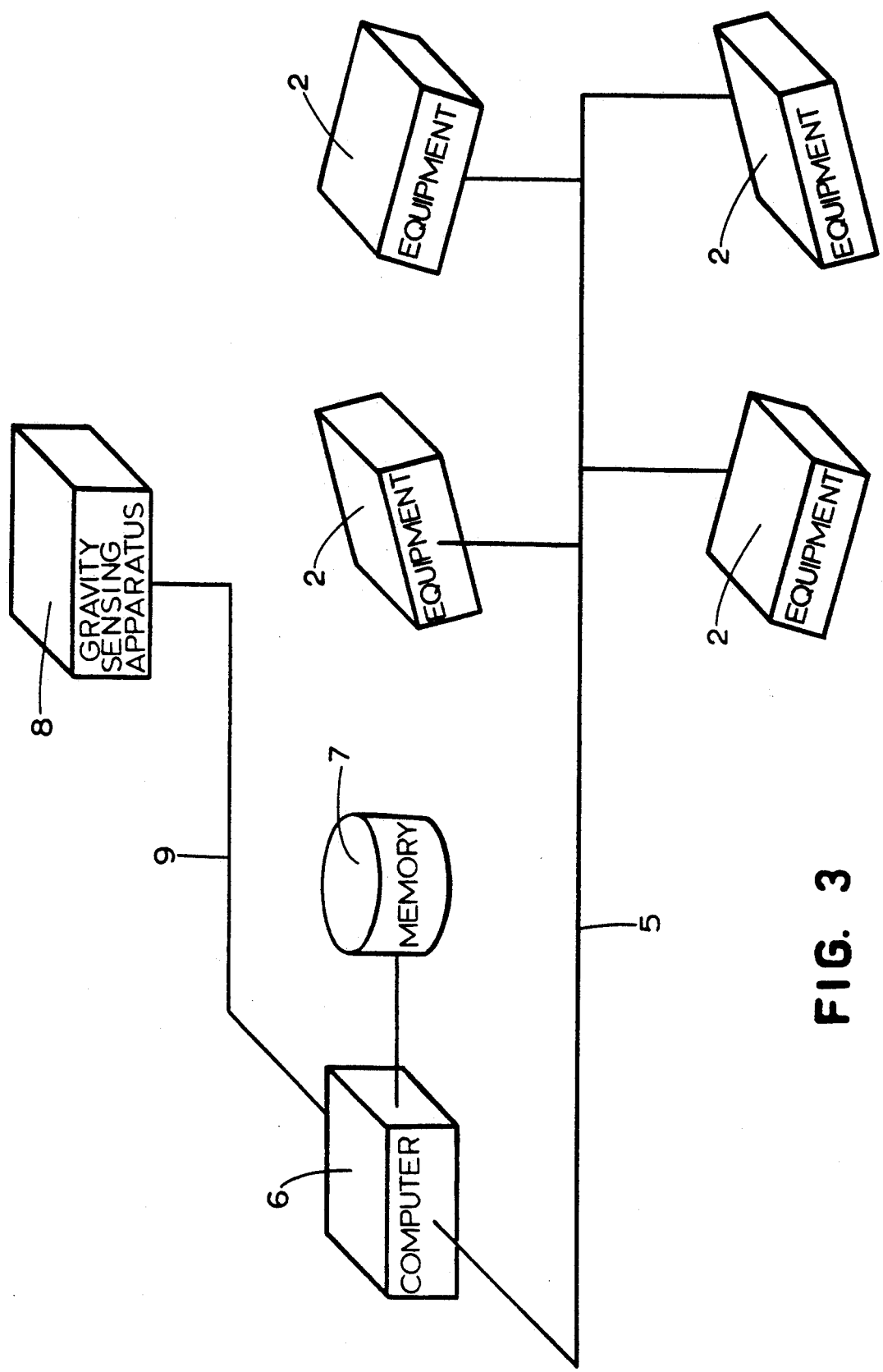
FIG. 3 illustrates the generalization of this harmonization method to the case of a plurality of M (M: positive integer) equipments to be harmonized.

FIG. 3 illustrates the generalization of this harmonization method to the case of a plurality of M (M: positive integer) equipments 2 to be harmonized, each having characteristic rotation operators R($\alpha$i, $\beta$i, $\Gamma$i) (with i=1 to M). Indeed, in this case it is possible to perform simultaneously the operations described earlier and to calculate simultaneously the plurality of rotation operators R($\alpha$i, $\beta$i, $\Gamma$i), from measurements made by the various equipments 2 and by a single appliance 8.

Furthermore, certain equipments 2 may comprise communications interfaces, this affording greater flexibility in respect of the harmonization.

In particular, use can be made of outputs from the equipment 2 or from the appliance 8 of highest performance, for example outputs relating to the speed and/or the acceleration of the vehicle, in order to improve the uniformity of the measurements of the other equipments 2 and specify the rotations of these latter relative to the reference appliance 8.

Moreover, the accuracy in the harmonization error correction according to said method can be further improved by continuing the comparison between the values measured by the appliance 8 and the equipment 2. New measurements are then made by arranging the vehicle 1 on the ground in a number of different orientations, greater than 2, and/or when the vehicle 1 moves for example with variable orientations in flight, this enabling a large number of data to be acquired making it possible to establish superabundant relationships in order to define the angles $\alpha$, $\beta$, and $\Gamma$. This offers the advantage of being able, through a conventional measurement error regression calculation, to define these angles $\alpha$, $\beta$ and $\Gamma$ with an accuracy greater than that of the instruments which made these measurements, the measurement error of each instrument being assumed to be unbiased relative to the theoretical value.

This improvement in the accuracy of the results leads on to performing a third series of steps, comprising the following steps:
- data $\bar{g}1j$ and $\bar{g}2j$ (with j: integer from 3 to N) output by the appliance 8 and by the equipment 2 respectively, and relating to a collection of (N-2) supplementary orientations of said vehicle 1 are measured;
- said data relating to said collection of (N-2) supplementary orientations are transmitted to the computer 6 via said first link 5;
- in the computer 6, a second rotation operator R2($\alpha$, $\beta$, $\Gamma$) is calculated, used, instead of the first rotation operator R1($\alpha$, $\beta$, $\Gamma$), to correct the errors of harmonization of the equipment(s) 2, this second rotation operator being obtained from the following superabundant equations:

$$\begin{vmatrix} g11 \\ g1j \\ g1N \end{vmatrix} = \begin{vmatrix} R2(\alpha, \beta, \Gamma) & 0 & 0 \\ 0 & R2(\alpha, \beta, \Gamma) & 0 \\ 0 & 0 & R2(\alpha, \beta, \Gamma) \end{vmatrix} \times \begin{vmatrix} g21 \\ g2j \\ g2N \end{vmatrix}$$

with j an integer from 1 to N, by a procedure minimizing the effect of the measurement errors, this improving the accuracy in the determination of the angles $\alpha$, $\beta$, $\Gamma$.

I claim:

1. A method for harmonizing an equipment (2) relative to a vehicle (1), said equipment (2) being installed fixedly on board said vehicle (1) which, relative to a first absolute reference system (RM), has an orientation defined by a second reference system (R2) tied to said vehicle (1), said equipment (2) being subjected to the earth's gravitational field represented by a gravity vector $\bar{g}$ oriented along its gradient, and the orientation of said equipment (2) being defined, relative to said first absolute reference system (RM), by a third reference system (R3), said equipment (2) comprising a device (3, 4) for measuring the components of said gravity vector fixed to said equipment (2); and said vehicle (1) carrying a computer (6); a memory (7) associated with said computer (6); and a first link (5) connecting the equipment (2) to said computer (6) and to said memory (7), said method comprising the following steps:

disposing, fixedly on board the vehicle (1), a gravity-sensing apparatus (8) harmonized relative to the vehicle and connected to said computer (6) and to said memory (7) by a second link (9);

placing the vehicle (1) in a first fixed position relative to the ground, corresponding to a first positioning (R21) of said second reference system (R2) relative to said first absolute reference system (RM);

measuring, with the gravity-sensing apparatus (8), first values representative of the components of a vector $\bar{g}11$ representing the earth's gravitational field $\bar{g}$ sensed by the gravity-sensing apparatus (8) in the second reference system (R2), and transforming said first values into first data indicative of said first values;

transmitting said first data to the memory (7), via said second link (9) connecting the gravity-sensing apparatus (8) to said memory (7), and storing said first data in said memory (7);

measuring with said equipment (2), second values representative of the components of a vector $\bar{g}21$ representing the earth's gravitational field $\bar{g}$ sensed by the equipment (2) in the third reference system (R3), and transforming said second values into second data indicative of said second values;

transmitting said second data to the memory (7), via said first link (5), and storing said second data in said memory (7);

placing the vehicle (1) in a second fixed position relative to the ground, corresponding to a second positioning (R22) of said second reference system (R2) relative to said first absolute reference system (RM);

measuring with the gravity-sensing apparatus (8), third values representative of the components of a vector $\bar{g}12$ representing the earth's gravitational field $\bar{g}$ sensed by the gravity-sensing apparatus (8) in the second reference system (R2), and transforming said third values into third data indicative of said third values;

transmitting said third data to the memory (7), via said second link (9) connecting the gravity-sensing apparatus (8) to said memory (7), and storing said third data in said memory (7);

measuring with the equipment (2), fourth values representative of the components of a vector $\bar{g}22$ representing the earth's gravitational field $\bar{g}$ sensed by the equipment (2) in the third reference system (R3), and transforming said fourth values into fourth data indicative of said fourth values;

transmitting said fourth values to the memory (7), via said first link (5), and storing said fourth values in said memory (7);

calculating a first rotation operator R1, in the computer (6), from said first data, second data, third data and fourth data, to correct the angular errors of harmonization of the measurements made in said third reference system (R3) of said equipment (2) relative to those made in said second reference system (R2) of said vehicle (1), according to the relationships:

$$\begin{vmatrix} \vec{g}11 \\ \vec{g}12 \end{vmatrix} = \begin{vmatrix} R1[(\alpha,\beta,\Gamma)] & 0 \\ 0 & R1[(\alpha,\beta,\Gamma)] \end{vmatrix} \times \begin{vmatrix} \vec{g}21 \\ \vec{g}22 \end{vmatrix}$$

storing in the computer (6) the rotation operator R1; and applying the rotation operator R1 to angles $\phi 2$, $\theta 2$, $\Omega 2$) determined subsequently, by the computer (6), from subsequent measurements, respectively representative of the angles of roll, of pitch attitude and of heading which are measured by said equipment (2) to give subsequent values measured by said equipment (2) according to its third reference system (R3).

2. The method as claimed in claim 1, wherein said first data and third data, on the one hand, and second data and fourth data, on the other hand, are respectively representative of the angles $\Phi 1$, $\theta 1$, $\Omega 1$ representing the angle of roll, the angle of pitch attitude and the angle of heading of said vehicle (1), on the one hand, said angles $\Phi 2$, $\theta 2$ and $\Omega 2$ representing the angle of roll, the angle of pitch attitude and the angle of heading of said equipment (2), on the other hand.

3. The method as claimed in claim 1 applied to a plurality of equipments (2) to be harmonized relative to said vehicle (1), each of these equipments (2) having first characteristic rotation operators R1, wherein the plurality of first rotation operators R1 are determined simultaneously, from measurements made by the various equipments (2) and by a gravity-sensing apparatus (8).

4. The method as claimed in claim 3, wherein there is a single memory (7).

5. The method as claimed in claim 3, wherein there is a single computer (6).

6. The method as claimed in claim 1, further comprising the steps of:

measuring data $\vec{g}1j$ and $\vec{g}2j$ (with j: interger from 3 to N), output respectively by the gravity-sensing apparatus (8) and by the equipment (2), and relating to supplementary orientations of the vehicle (1);

transmitting said data relating to said supplementary orientations of the vehicle (1) to the computer (6) via said first link (5);

calculating in the computer (6), a second rotation operator R2 and using said second rotation operator R2 instead of the first rotation operator R1 to correct the errors of harmonization of the equipment(s) (2), this second rotation operator being obtained from the following superabundant equations:

$$\begin{vmatrix} \vec{g}11 \\ \vec{g}1j \\ \vec{g}1N \end{vmatrix} = \begin{vmatrix} R2 & 0 & 0 \\ 0 & R2 & 0 \\ 0 & 0 & R2 \end{vmatrix} \times \begin{vmatrix} \vec{g}21 \\ \vec{g}2j \\ \vec{g}2N \end{vmatrix}$$

with j an integer from 1 to N, by a procedure minimizing the effect of the measurement errors.

7. The method as claimed in claim 1, wherein the accuracy of the gravity-sensing apparatus (8) is higher than the accuracy of the equipment (2).

8. The method as claimed in claim 1, wherein said gravity-sensing apparatus (8) or at least one equipment (2) outputs data relating to the speed and/or the acceleration of said vehicle (1).

9. A system for harmonizing an equipment means (2) relative to a vehicle (1), said equipment means (2) being installed fixedly on board said vehicle (1) which, relative to a first absolute reference system (RM), has an orientation defined by a second reference system (R2) tied to said vehicle (1), said equipment means (2) being subjected to the earth's gravitational field represented by a gravity vector $\vec{g}$ oriented along its gradient, and the orientation of said equipment means (2) being defined, relative to said first absolute reference system (RM), by a third reference system (R3), said system comprising:

means (8) for measuring first values representative of the components of a vector $\vec{g}11$ representing the earth's gravitational field $\vec{g}$ in the second reference system R2 when the vehicle (1) is in a first fixed position relative to the ground, corresponding to a first positioning (R21) of said second reference system (R2) relative to said first absolute reference system (RM), and for transforming said first values into first data indicative of said first values;

equipment means (2) for measuring second values representative of the components of a vector $\vec{g}21$ representing the earth's gravitational field $\vec{g}$ in the third reference system (R3) when the vehicle (1) is in a first fixed position relative to the ground, corresponding to a first positioning (R21) of said second reference system (R2) relative to said first absolute reference system (RM), and for transforming said second values into second data indicative of said second values;

means (8) for measuring third values representative of the components of a vector $\vec{g}12$ representing the earth's gravitational field $\vec{g}$ in the second reference system (R2) when the vehicle (1) is in a second fixed position relative to the ground, corresponding to a second positioning (R22) of said second reference system (R2) relative to said first absolute reference system (RM), and for transforming said third values into third data indicative of said third values;

equipment means (2) for measuring fourth values representative of the components of a vector $\vec{g}22$ representing the earth's gravitational field $\vec{g}$ in the third reference system (R3) when the vehicle (1) is in a second fixed position relative to the ground, corresponding to a second positioning (R22) of said second reference system (R2) relative to said first absolute reference system (RM), and for transforming said fourth values into fourth data indicative of said fourth values;

means (6) for calculating a first rotation operator R1 from said first data, second data, third data and fourth data to correct the angular errors of harmonization of the measurements made in said third reference system (R3) of said equipment means (2) relative to those made in said second reference system (R2) of said vehicle (1), according to the relationships:

$$\begin{vmatrix} \vec{g}11 \\ \vec{g}12 \end{vmatrix} = \begin{vmatrix} R1 & 0 \\ 0 & R1 \end{vmatrix} \times \begin{vmatrix} \vec{g}21 \\ \vec{g}22 \end{vmatrix}$$

means (7) for storing the rotation operator R1; and
means (6) for applying the rotation operator R1 to angles ($\phi 2$, $\theta 2$, $\Omega 2$) determined subsequently from subsequent measurements, respectively representative of the angles of roll, of pitch, attitude and of heading which are measured by said equipment means (2) to give subsequent values measured by said equipment means (2) according to its third reference system (R3).

10. The system as claimed in claim 9, wherein the measuring means (8) or at least one equipment (2) provides data relating to the speed and/or the acceleration of said vehicle (1).

* * * * *